United States Patent
Tsadik et al.

(10) Patent No.: US 8,745,291 B2
(45) Date of Patent: Jun. 3, 2014

(54) INTER-PROCESSOR COMMUNICATION APPARATUS AND METHOD

(75) Inventors: Meir Tsadik, Hod Hasharon (IL); Albert Yosher, Ra'anana (IL)

(73) Assignee: Qualcomm Incorporated, San Diego, CA (US)

( * ) Notice: Subject to any disclaimer, the term of this patent is extended or adjusted under 35 U.S.C. 154(b) by 170 days.

(21) Appl. No.: 13/252,276

(22) Filed: Oct. 4, 2011

(65) Prior Publication Data

US 2013/0086286 A1 Apr. 4, 2013

(51) Int. Cl.
*G06F 5/00* (2006.01)

(52) U.S. Cl.
USPC .......................................... 710/53

(58) Field of Classification Search
None
See application file for complete search history.

(56) References Cited

U.S. PATENT DOCUMENTS

| | | | | |
|---|---|---|---|---|
| 6,021,132 | A * | 2/2000 | Muller et al. | 370/412 |
| 6,134,619 | A | 10/2000 | Futral et al. | |
| 6,356,962 | B1 * | 3/2002 | Kasper | 710/29 |
| 6,931,497 | B2 * | 8/2005 | Clayton et al. | 711/147 |
| 2007/0174837 | A1 | 7/2007 | Wang et al. | |

FOREIGN PATENT DOCUMENTS

| | | |
|---|---|---|
| GB | 2375408 A | 11/2002 |
| WO | WO-03003232 A2 | 1/2003 |

OTHER PUBLICATIONS

Notification of Transmittal of the International Search Report and the Written Opinion of the International Searching Authority, Int'l App. No. PCT/US2012/058791, ISA/EPO, Feb. 22, 2013, 11 pgs.

Hopcroft et al., Einführung in die Automatentheorie, Formale Sprachen und Komplexitätstheorie, Addison-Wesley (Deutschland) GmbH, 1990, pp. 183-184, XP002691290, ISBN 3-89319-181-X, 3 pgs.

\* cited by examiner

*Primary Examiner* — Henry Tsai
*Assistant Examiner* — Juanito Borromeo

(57) ABSTRACT

Inter-processor communication (IPC) apparatus and a method for providing communication between two processors having a shared memory, the IPC apparatus including an arbitrated bus coupling the processors to one another and to the memory, a buffer in the shared memory associated with each processor, and at least one pair of First In First Out hardware units (FIFOs) coupled to each processor, the FIFOs holding pointers to addresses in the buffer associated with that processor, wherein a first of the pair of FIFOs (an empty buffer FIFO) is configured to hold pointers to empty portions of the buffer while the second of the pair of FIFOs (a message FIFO) is configured to hold pointers to portions of the buffer having data therein.

27 Claims, 3 Drawing Sheets

INTER-PROCESSOR COMMUNICATION APPARATUS AND METHOD

FIELD OF THE INVENTION

The present invention relates to a multiprocessor device, in general and, in particular, to an inter-processor communication apparatus and method for a multiprocessor device.

BACKGROUND OF THE INVENTION

Computer devices utilizing multiple processors are well known in the art, and are in wide use. Typically, in these devices, each processor receives data to be processed, performs certain calculations and sends the processed data to be further processed by a different processor. The data to be processed by each of the processors is saved in buffers in memory, which is typically a shared resource. The sender selects a buffer in which to store a message, checks if the buffer is available, then begins to write, which requires more than one cycle. Thus, it is important to ensure mutual exclusivity, so that no buffer is allocated to two processors simultaneously. Thus, no two processors will write to the same buffer at the same time. Intercommunication between these processors is accomplished by sending messages from one to the other.

Sending a message from a first processor to a second processor is carried out by the operating system. The first processor notifies the operating system that a message addressed to a second processor is stored at a certain address in the memory. The operating system stops the receiving processor and provides the address to a buffer in which the message is stored to the second processor. The second processor reads the message stored at the received buffer, and processes the data stored in that buffer. The second processor then notifies the operating system that the data is ready for further processing, or is ready to be used.

A managing scheme can be implemented by the operating system to control and coordinate the operation of the processors to ensure mutual exclusivity. However, utilizing the operating system is expensive in terms of resources, as each time a message is delivered the operating system must intervene, causing a bottle neck and requiring large overhead.

Accordingly, there is a long felt need for a device and method for improved inter-processor communication, and it would be very desirable if such a device and method operated without requiring intervention by the operating system.

SUMMARY OF THE INVENTION

The present invention relates to an inter-processor communication apparatus and method which is implemented largely in hardware and does not require intervention by the operating system. The apparatus includes a memory device having at least one buffer (addresses in the memory) associated with each processor, either physically or virtually, either fixed or dynamic, and at least one pair of First In First Out hardware units (hereinafter "FIFOs") holding pointers to the addresses associated with that processor. One of the pair of FIFOs holds pointers (addresses) of empty buffers while the second of the pair of FIFOs holds pointers (addresses) of buffers having data therein.

According to some embodiments of the invention, each processor is provided with more than one pair of FIFOs. Each pair of FIFOs can be used, for example, for holding data of a different priority or type.

There is provided according to the present invention an inter-processor (IPC) apparatus for communication between two processors having a shared memory, the IPC apparatus including an arbitrated bus coupling the processors to one another and to the memory, and a buffer or plurality of buffers in the shared memory associated with each processor. At least one pair of First In First Out hardware units (FIFOs) are coupled to each processor. The FIFOs hold pointers to addresses in the buffer associated with that processor. A first of the pair of FIFOs (an empty buffer FIFO) is configured to hold pointers to empty buffers while a second of the pair of FIFOs (a message FIFO) is configured to hold pointers to buffers having data therein.

According to some embodiments of the invention, the IPC apparatus includes two or more pairs of FIFOs associated with each processor, one pair holding pointers for high priority data and one pair holding pointers for lower priority data.

There is also provided, according to the invention, a method for providing inter-processor communication between two processors having a shared memory, the method including coupling the processors to one another and to the memory by an arbitrated bus, and associating a plurality of addresses in the shared memory with each processor. The method further includes coupling at least one pair of First In First Out hardware units (FIFOs) to each processor, the FIFOs holding pointers (addresses) to the buffers associated with that processor. A first of the pair of FIFOs (an empty buffer FIFO) is configured to hold pointers to empty buffers and a second of the pair of FIFOs (a message FIFO) is configured to hold pointers to buffers having data therein.

According to some embodiments, the method further includes pushing, into the empty buffer FIFO of a processor, pointers to buffers associated with that processor and popping one of the pointers from the empty buffer FIFO, storing data for that processor in the buffer at the address of the pointer, and pushing the pointer into the message FIFO of that processor.

According to some embodiments, the step of coupling includes coupling multiple pairs of FIFOs to each processor, each pair holding pointers for a specific priority data.

BRIEF DESCRIPTION OF THE DRAWINGS

The present invention will be further understood and appreciated from the following detailed description taken in conjunction with the drawings in which.

DETAILED DESCRIPTION OF THE INVENTION

The present invention relates to the design of a multiprocessor inter-processor communication (IPC) infrastructure for supporting message interchange between multiple agents, residing on multiple different processors, on a particular chip or system. This apparatus includes a memory coupled to multiple processors, all typically coupled by a shared bus with an arbitration mechanism. All the processors are mutually accessible by one another via the memory??.

Each processor has defined buffer space, with associated addresses in the memory, for storing received data, and a mechanism for informing the processor when a message or data is waiting for processing. According to a preferred embodiment of the invention, each processor includes at least one first First In First Out hardware unit (hereinafter FIFO), for holding pointers to empty buffers, and at least one second FIFO, for holding pointers to buffers with received messages. These FIFOs are hooked to the shared bus and are accessible by all the processors. In order to simplify the description of the invention, the term "empty buffer FIFO", as used in this application, shall refer to a FIFO or other special memory for holding pointers to empty buffers. Similarly, the term "message FIFO" as used in this application, shall refer to a FIFO or other special memory for holding pointers to buffers with received messages.

When a first processor wants to send a message or data to a second processor for processing, the first processor pops one pointer from the empty buffer FIFO of the second processor. The popped pointer is an address associated with the second processor pointing to a buffer in the data memory to which the first processor can write the data. The first processor then pushes the pointer into the message FIFO of the second processor, indicating that a message is waiting.

The second processor periodically pops the pointers from the message FIFO and reads and process the data stored in the buffers pointed to by these pointers. The second processor then pushes the pointers back to the empty buffer FIFO associated with the second processor.

It is a particular feature of the invention that this entire process occurs without intervention by the operating system, thereby reducing processing time and reducing resources required for inter-processor communication. It will further be appreciated that, since a pointer is popped from the empty buffer FIFO in a single cycle of a shared bus, there is no possibility that two processors attempting to get a buffer address will get the same pointer, because mutual exclusivity is built into the system bus.

Figure 1:
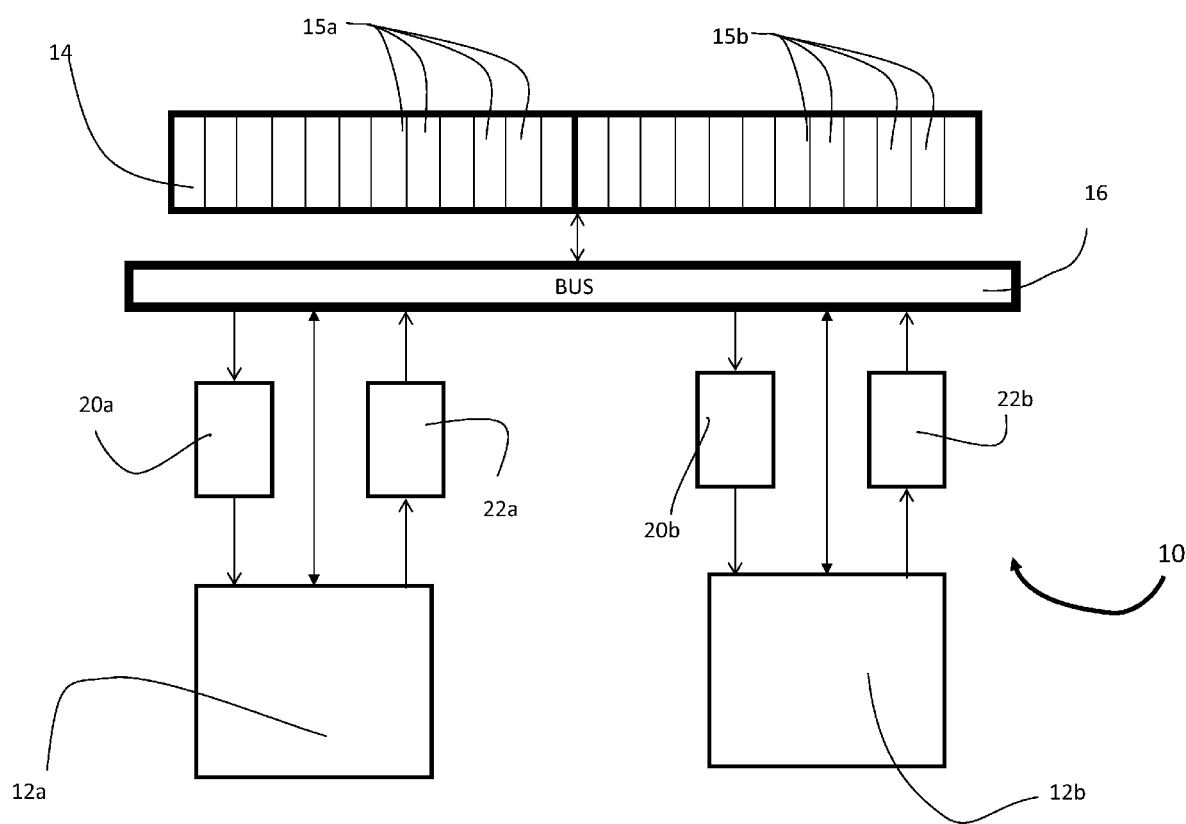
FIG. 1 is a block diagram illustration of a processing unit including inter-processor communication apparatus, constructed and operative in accordance with one embodiment of the present invention.

FIG. 1 is a block diagram of a processing unit 10 constructed and operative in accordance with the present invention. For ease of description, processing unit 10 is illustrated as having two processors. However, alternatively, any suitable number of processors can be incorporated in the unit, according to the invention. Processing unit 10 includes a first processor 12a and a second processor 12b. Processors 12a and 12b are both coupled to a memory device 14 via a bus 16. Memory device 14 includes a plurality of buffers 15a, 15b each identified by a unique address. According to one embodiment, buffers 15a are associated with first processor 12a and buffers 15b are associated with second processor 12b. In this way, the data stored in buffers 15a is directed for processing by processor 12a, and the data stored in buffers 15b is directed for processing by processor 12b. All the buffers in memory device 14 are accessible by first and second processors 12a, 12b via bus 16, which includes an arbitration mechanism. It will be appreciated that memory device 14 can be a separate memory device, as illustrated, or, alternatively, buffers from memory can be incorporated inside each processor 12a, 12b, as long as they are accessible by all the other processors.

First processor 12a is further coupled for writing to an empty buffer FIFO 20a configured for holding pointers to certain buffers 15a, associated with processor 12a, and which are currently empty, i.e. have no pending messages stored therein. In addition, first processor 12a is coupled for reading to a message FIFO 22a configured for holding pointers to other buffers 15a which include messages pending to be processed by first processor 12a.

Similarly, second processor 12b is coupled for writing to an empty buffer FIFO 20b configured for holding pointers to those buffers 15b associated with processor 12b, which are currently empty, i.e. have no pending messages stored therein. In addition, second processor 12b is coupled for reading to a message FIFO 22b configured for holding pointers to those buffers 15b which include messages pending to be processed by second processor 12b.

As can be seen, first processor 12a is coupled for reading from the empty buffer FIFO 20b of second processor 12b and is coupled for writing to message FIFO 22b of second processor 12b via bus 16. Similarly, second processor 12b is coupled for reading to the empty buffer FIFO 20a and is coupled for writing to the message FIFO 22a of processor 12a, via bus 16. Bus 16 enables communication between the first processor 12a and FIFOs 20b and 22b of second processor 12b, and the communication between second processor 12b and FIFOs 20a and 22a of first processor 12a. When the processing unit includes more than two processors, it will be appreciated that each processor is coupled to at least one FIFO to which only it can write but from which all the other processors can read, and to at least one FIFO from which only it can read and to which all the other processors can write. In addition, bus 16 is coupled to memory device 14, thus, allowing communication between first and second processor 12a and 12b and memory device 14 via the bus 16. It is a particular feature that bus 16 guarantees mutually exclusive reading and writing. This means that if two processors try to read from or write to any FIFO at the same time, the bus will impose an order between the two competing processors. In this way, each time only one processor reads or writes from or to a shared FIFO. It will be appreciated that communication between the different components of processor 10 may be implemented in another fashion from a bus, for example, by implementing a message switching mechanism.

Figure 2:
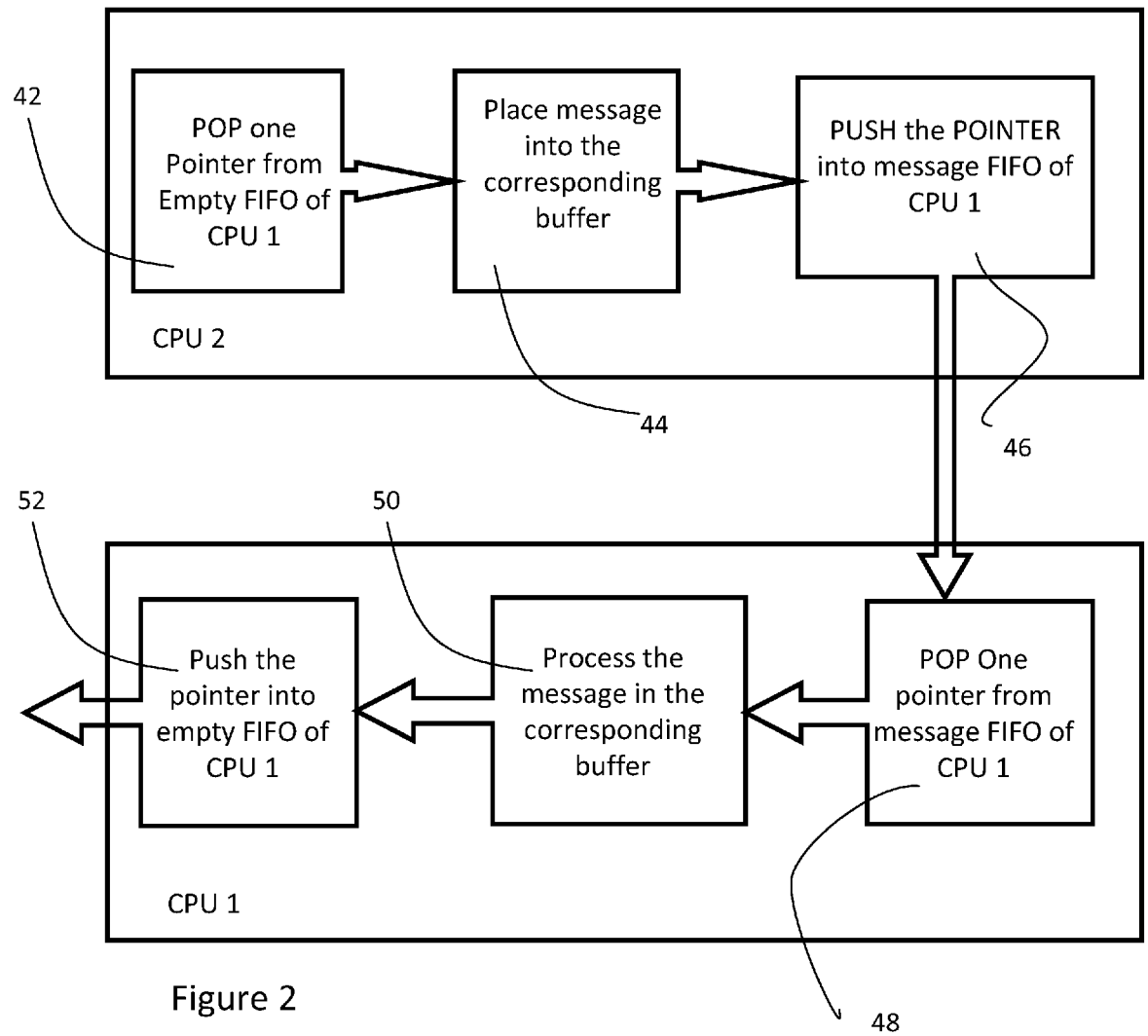
FIG. 2 is a flow chart illustration of one operation of the processing unit of FIG. 1, according to one embodiment of the invention.

FIG. 2 is a flow chart illustrating one method of operation of processing unit 10 of FIG. 1, according to one embodiment of the present invention. When data is to be sent from the second processor to the first processor, the second processor pops one pointer from the empty buffer FIFO of the first processor (block 42). The second processor stores the data for the first processor in the buffer corresponding to the popped pointer (block 44). The data may be in the form of a message containing the data and/or a processing instruction, etc. Upon completion of data writing, the second processor pushes the popped pointer into the message FIFO of the first processor (block 46) to notify it that a message is waiting for it in the location pointed to by the pointer. When the empty buffer FIFO is empty, meaning no buffer space associated with that particular processor is empty or available, the pop operation return a null pointer. In this case, processor one may choose to continue attempting the pop operation until it gets a non null pointer (i.e., until a buffer has become available) or to do something else and perform the message sending at other time. This mechanism enables the message sending operation to be non blocking. That is, the sender is not stopped if the message send operation can not be performed, as occurs in conventional systems.

According to one embodiment, the first processor periodically checks its message FIFO. Whenever its message FIFO contains a pointer, the first processor pops the pointer out (block 48). The first processor reads and processes the message stored in the memory buffer corresponding to the popped pointer (block 50). The first processor then pushes the pointer back into its empty buffer FIFO (block 52) making this buffer available, once again, for storing a message for the first processor.

It will further be appreciated that this operation can be carried out in the opposite direction, in which the first processor sends data or a message to the second processor. In this case, the first processor pops one pointer from the empty buffer FIFO of the second processor and stores data in a data buffer, associated with the second processor, corresponding to the popped pointer. The first processor then pushes the pointer into the message FIFO of the second processor (not shown in the diagram). The second processor will pop the pointer from its message FIFO, process the data stored in the corresponding data buffer, and push the pointer back into its empty buffer FIFO.

As mentioned hereinabove, according to one embodiment, each processor is programmed to check, periodically, its message FIFO for pending pointers. This can be implemented by means of a loop. This means, for example, automatically after processing data associated with one pointer, the pointer is pushed back to the empty buffer FIFO and the next pointer is popped from the message FIFO. Alternatively, after a preselected time period has passed, the message FIFO can be checked again. It will be appreciated that, when the message FIFO is empty, and the processor has processed all the pending messages and pushed the pointers back to the empty buffer FIFO, the processor can perform other, unrelated operations, while periodically checking its message FIFO.

Alternatively or in addition, the message FIFO may include alert mechanism hardware, alerting the processor of the status of pointers in its FIFO. This logic hardware checks the status of the FIFOs and outputs a signal according to the number of pointers therein. The mechanism can be set by the user so that one of the signals is connected to the interrupt of the processor, alerting it to the status of the FIFO. According to one embodiment, an alert may be generated each time a pointer is pushed into a message FIFO. Alternatively, an alert may be generated, for example, when the message FIFO contains a preset number of pointers. The alert system would then signal the processor to pop the pointers from the message FIFO and to process the data stored in the corresponding buffers. Alternatively, different alerts can be generated to indicate that the empty buffer FIFO is completely or partially empty, or that the message FIFO is partially or completely full. The alert signal can be set so that the receipt of a selected number of messages will be interpreted as "almost full" and be connected to the interrupt. Or the user may prefer to connect the "quarter full" number of messages to the interrupt, for more frequent review of incoming messages.

Figure 3:
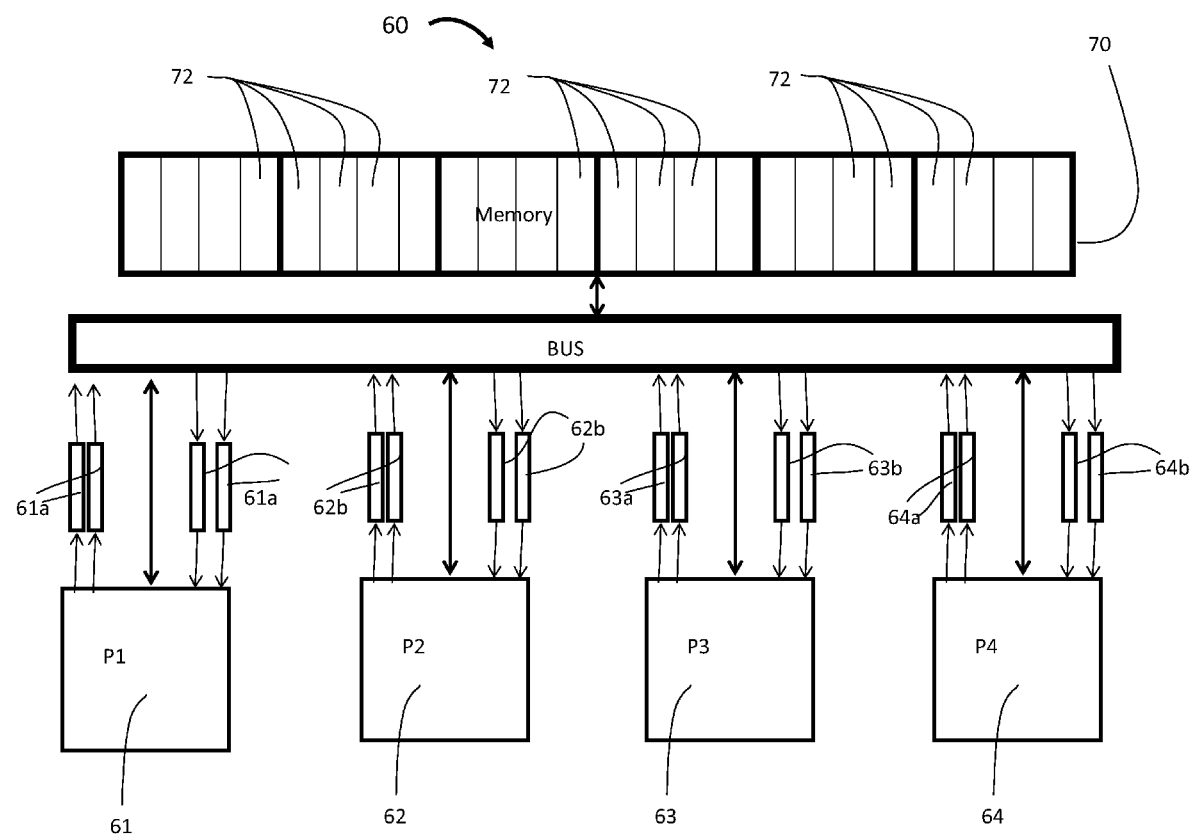
FIG. 3 is a block diagram illustration of a processing unit including inter-processor communication apparatus, according to another embodiment of the invention.

FIG. 3 is a block diagram of a processing unit 60 having an IPC constructed and operative in accordance with another embodiment of the present invention. Processing unit 60 operates in substantially the same manner as processing unit 10 of FIG. 1. Processing unit 60 includes a plurality of processors, here illustrated as four processors 61 to 64, and a memory device 70 coupled by a bus 66. Each one of processors 61-64 is coupled to two empty buffer FIFOs 61*a*-64*a* and two message FIFOs 61*b*-64*b*, respectively. Memory device 70 includes a plurality of buffers 72, each associated physically or virtually with one of processors 61-64. At least two pairs of FIFOs are provided associated with each processor to permit one pair to act as the empty buffer and message FIFOs for high priority messages and the second pair to act as the empty and message FIFOs for low priority messages. It will be appreciated that further pairs of FIFOs can be coupled to each processor as required, for different types, classes, priorities, etc.

Each FIFO is configured to hold a preset number of pointers, preferably corresponding to the number of buffers associated with each processor. For example, the FIFO may be adapted to hold 128 pointers corresponding to 128 buffers 72 in the memory device 70. Accordingly, the memory device 70 may include 128 buffers for each of the four processors 61-64, i.e. 512 buffers. Associating each buffer with one of processors 61-64 is preferably carried out during initialization of the processing unit 60, for example, when the processing unit is turned on.

It will be appreciated that the size of each pointer may vary in accordance with the size of memory device 70. For example, when the size of memory device 70 is 4 Giga bytes, each pointer must be 32 bits. It will be further appreciated that memory device 70 may be formed as an integral part of processing unit 60, or alternatively, may be any external memory device, as known in the art. In the latter case, processing unit 60 includes appropriate coupling means for coupling to the memory device, as known in the art.

Bus 68 in processing unit 60 is preferably configured for controlling the communication between processors 61-64, so as to allow each processor to pop and push a pointer to or from another processor. For example, if both processor 61 and processor 63 must send data to be processed by processor 64, both processors 61 and 63 must pop a pointer from empty buffer FIFO 64*a* and push it into FIFO 64*b*. In this case, the arbitration mechanism in bus 68 controls the order of the communication, so as to ensure mutual exclusivity.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. An inter-processor communication (IPC) apparatus comprising:
   a first processor and a second processor communicatively coupled to one another and to a shared memory by an arbitrated bus; and
   at least one pair of hardware queues coupled to each of the processors, each pair of hardware queues comprising a first queue associated with empty buffers of that processor and a second queue associated with buffers containing messages for that processor;
   wherein the first processor is configured to:
      pop a first pointer from the first queue of the second processor, the first pointer associated with an empty buffer of the second processor;
      place a message to the second processor from the first processor in the empty buffer associated with the first pointer; and
      push the first pointer to the second queue of the second processor.

2. The IPC apparatus according to claim 1, wherein the at least one pair of hardware queues comprises two pairs of queues associated with each processor, each pair holding pointers for a different priority of data.

3. A method for providing inter-processor communication (IPC) between a first processor and a second processor, wherein the first and second processors are coupled to a shared memory having buffers each of which are associated with the first processor or the second processor, the method comprising:
   popping, by the first processor, a first pointer from a first hardware queue of the second processor, the first hardware queue associated with empty buffers of the second processor, and the first pointer associated with one of the empty buffers;

placing a message to the second processor from the first processor in the empty buffer associated with the first pointer; and pushing, by the first processor, the first pointer to a second hardware queue of the second processor, the second hardware queue associated with buffers containing messages for the second processor.

4. The method according to claim 3, further comprising:
attempting, by the first processor, to pop a second pointer from the first queue of the second processor; and
receiving a null pointer, the null pointer indicating that the first queue is empty.

5. The IPC apparatus according to claim 1, wherein the first queue of the pair of hardware queues for each processor comprises a queue to which only that processor is able to write.

6. The IPC apparatus according to claim 1, wherein the second queue of the pair of hardware queues for each processor comprises a queue which only that processor is able to read.

7. The IPC apparatus according to claim 1, wherein the bus comprises a bus configured to guarantee mutually exclusive reading and writing for each of the queues.

8. The IPC apparatus according to claim 1, wherein at least one of the hardware queues is configured to return a null value in response to a pop operation when that queue is empty.

9. The IPC apparatus according to claim 1, wherein at least one of the hardware queues comprises a First In First Out (FIFO) queue.

10. The method of claim 4, further comprising:
periodically attempting, by the first processor, to pop the second pointer from the first queue of the second processor until a non-null pointer is received from the first queue.

11. The method according to claim 3, wherein at least two pairs of queues are associated with the second processor, each pair configured to hold pointers for a different priority of data.

12. The method according to claim 3, wherein the first hardware queue of the second processor comprises a queue to which only the second processor is able to write.

13. The method according to claim 3, wherein the second hardware queue of the second processor comprises a queue which only the second processor is able to read.

14. The method according to claim 3, wherein the first processor and the second processor are each communicatively coupled with an arbitrated bus configured to provide mutually exclusive reading and writing for each of the queues.

15. The method according to claim 3, wherein at least one of the queues comprises a First in First Out (FIFO) queue.

16. A computer program product for providing inter-processor communication (IPC) between a first processor and a second processor, wherein the first and second processors are coupled to a shared memory having buffers each of which are associated with the first processor or the second processor, the computer program product comprising:

a computer readable storage device, the computer readable storage device configured to store computer readable program code that, when executed by at least the first processor, causes the first processor to:

pop a first pointer from a first hardware queue of the second processor, the first hardware queue associated with empty buffers of the second processor, and the first pointer associated with one of the empty buffers;

place a message to the second processor from the first processor in the empty buffer associated with the first pointer; and push the first pointer to a second hardware queue of the second processor, the second hardware queue associated with buffers containing messages for the second processor.

17. A method of providing inter-processor communication (IPC) between a first processor and a second processor, wherein the first and second processors are coupled to a shared memory having buffers each of which are associated with the first processor or the second processor, the method comprising:

popping, by the first processor, a first pointer from a first hardware queue of the first processor, the first hardware queue associated with messages for the first processor;

processing, by the first processor, a message from the second processor stored at a buffer of the shared memory associated with the first pointer; and pushing, by the first processor, the first pointer to a second hardware queue of the first processor, the second hardware queue associated with empty buffers of the first processor.

18. The method of claim 17, further comprising:
popping, by the first processor, a second pointer from the first hardware queue in response to the pushing the first pointer to the second hardware queue.

19. The method of claim 18, further comprising:
receiving an alert from at least one of the hardware queues at the first processor.

20. The method of claim 19, the alert comprising an interrupt to the first processor.

21. The method of claim 19, the alert comprising at least one of: an alert that the first queue is at least partially full or an alert that the second queue is at least partially empty.

22. The method of claim 17, further comprising:
checking at the first processor periodically for pending pointers associated with the first queue.

23. The method according to claim 17, wherein at least two pairs of queues are associated with the first processor, each pair configured to hold pointers for a different priority of data.

24. The method according to claim 17, the first hardware queue of the first processor comprising a queue which only the first processor is able to read.

25. The method according to claim 17, the second hardware queue of the first processor comprising a queue to which only the first processor is able to write.

26. The method according to claim 17, wherein the first processor and the second processor are each communicatively coupled with an arbitrated bus configured to provide mutually exclusive reading and writing for each of the queues.

27. The method according to claim 17, wherein at least one of the queues comprises a First in First Out (FIFO) queue.

* * * * *